Jan. 3, 1967 A. FISCHER 3,295,618

DOWEL BIT AND METHOD OF MANUFACTURING THE SAME

Original Filed May 8, 1960

INVENTOR.
ARTUR FISCHER
BY
Michael S. Striker
ATTORNEY

United States Patent Office 3,295,618
Patented Jan. 3, 1967

3,295,618
DOWEL BIT AND METHOD OF MANU-
FACTURING THE SAME
Artur Fischer, Tumlingen, Kreis Freudenstadt, Germany
Original application May 9, 1960, Ser. No. 27,738, now
Patent No. 3,208,542, dated Sept. 28, 1965. Divided
and this application May 14, 1965, Ser. No. 455,924
Claims priority, application Germany, May 8, 1959,
F 28,402; May 26, 1959, F 28,520
6 Claims. (Cl. 175—403)

This application is a division of my application Serial No. 27,738, filed May 9, 1960, and entitled "Dowel Bit," now U.S. Patent No. 3,208,542.

The present invention relates to improvements in dowel bits of the type utilized for drilling bores in plaster, brick, concrete and like materials, and to a method of manufacturing such bits.

An important object of the present invention is to provide a one-piece dowel bit which may be manufactured and assembled in a very simple, time-saving and inexpensive manner.

Another important object of the invention is to provide a dowel bit which may be utilized as a means for forming dowel holes while held by an operator's hand or in a drilling or boring machine, and wherein the bore-forming portion and the handle portion constitute an integral unit.

An additional object of the invention is to provide a dowel bit of the above outlined characteristics which is constructed in such a way that the material removed from a wall or the like in which a dowel hole is to be formed is discharged in a fully automatic way when the tool is put to use.

A concomitant object of the instant invention is to provide a dowel bit of the about outlined type which is constructed and assembled in such a way that it cannot become damaged if inserted into the chuck of a drilling machine or the like, and which may be formed with more than one cutting edge so as to require less frequent sharpening.

Still another object of the invention is to provide a dowel bit which is constructed and assembled in such a way that it may permit automatic discharge of removed material at two or more points.

An additional object of the invention is to provide a very simple and convenient method of forming dowel bits of the above outlined characteristics.

With the above objects in view, the invention resides in the provision of a dowel bit which comprises essentially a first portion which is formed with at least one cutting end and which is of tubular shape, and an integral second portion which may constitute a coaxial extension of the first portion and acts as a holder for the first portion. The first portion is preferably formed with a serrated cutting end and is slotted to permit automatic discharge of material removed from a wall or the like when the dowel bit is in actual use. When the two portions are coaxial with each other, the second portion is also formed with a cutting end and the slot extends all the way between the two cutting ends so that the bit may be used from either end, for example, by inserting one portion and one cutting end into the chuck of a drilling or boring machine. In such instances, the hollow interior of the tubular body preferably receives a core member which is formed with a projection extending through the aforementioned slot, this core member preventing collapse or any other deformation of the portion received in the chuck and its projection at the same time preventing rotation of the tubular body with respect to the chuck. This is particularly important when the tubular body is of cylindrical cross sectional contour. On the other hand, it is often preferred to form the tubular body with a polygonal, e.g. square, hexagonal or like cross section in order to prevent its rotation in the chuck and also to provide additional passages for discharge of material from the dowel hole when the bit is put to use.

The improved method comprises forming a plate-like metallic blank with at least one preferably serrated cutting edge and thereupon rolling the blank into the form of a tubular body so that its serrated edge forms the cutting end of the tubular body.

The novel features which are considered as characteristic for the invention are set forth in particular in the appended claims. The invention itself, however, both as to its construction and its method of operation, together with additional objects and advantages thereof, will be best understood from the following detailed description when read in connection with the accompanying drawings, in which:

Figure 1:
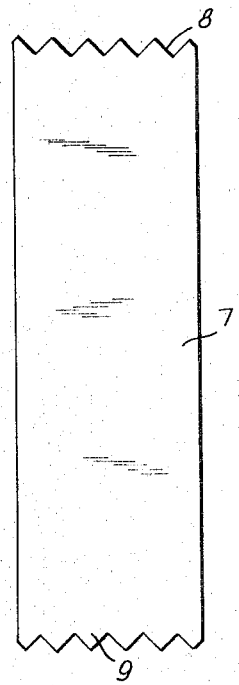
FIG. 1 illustrates a blank prior to rolling into a tubular dowel bit with two cutting ends.
Figure 2:
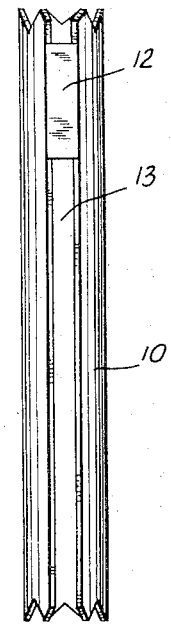
FIG. 2 is a side elevational view of the bit formed from the blank shown in FIG. 1.
Figure 3:
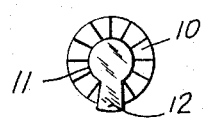
FIG. 3 is an end view of the bit shown in FIG. 2.

Referring now in greater detail to the illustrated embodiments, and first to FIG. 1, there is shown a metallic plate-like blank 7 which is of rectangular shape and whose longitudinal ends are formed with serrated cutting edges 8, 9. The blank 7 is preferably formed by stamping and may be furnished in many dimensions, depending upon the desired diameter of the tubular body to be formed from it, i.e. upon the diameter of the holes which are to be made with my improved dowel bit. After rolling into the shape of a hollow cylindrical tube 10 which is shown in FIGS. 2 and 3, the cutting edges constitute the cutting ends of the dowel bit. In this embodiment, the lower portion of the tubular body 10 may constitute the actual dowel bit while the upper portion constitutes the handle or holding portion, or vice versa. The tubular body 10 is formed with an elongated slot 13 which extends between the two cutting ends and slidably guides a projection 12 which forms part of a cylindrical core member 11, the latter being slidably received in and filling a portion of the space within the tubular body 10. This core member is preferably made of a hard synthetic plastic material and is slidable all the way between the two cutting ends 8, 9 of the tubular body 10. When the dowel bit of FIG. 2 is inserted into a drilling or boring machine, its upper or its lower portion is received in the customary chuck, not shown, together with the core member 11 so that the chuck cannot cause a collapse or other deformation of the hollow tubular body 10. The projection 12 extends through the slot 13 and prevents a rotation of the tubular body 10 with respect to the boring machine by engaging with the chuck.

Figure 4:
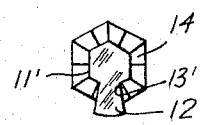
FIG. 4 is an end view of a slightly modified bit.

FIG. 4 shows a slight modification of the dowel bit whose tubular body 14 is of polygonal cross-sectional contour. The configuration of the core member 11' is changed accordingly so as to completely fill the interior of the tubular body 14. In the embodiment of FIG. 4, the tubular body 14 is of hexagonal cross section; however, it will be readily understood that this tubular body may be of pentagonal, square, octagonal or any other polygonal cross-sectional shape. An important advantage of a dowel bit constructed as shown in FIG. 4 is that it permits discharge of comminuted material at more than one point, i.e. through the slot 13' for the projection 12' of the core member 11', as well as between the wall of the circular bore drilled in a wall and the outer facets of the tubular body 14.

Without further analysis, the foregoing will so fully reveal the gist of the present invention that others can by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A dowel bit for drilling bores in plaster, brick, concrete and like materials, said bit comprising a tubular body having a wall of constant thickness and consisting of a first portion having a cutting end, and a second portion which is gripped while the dowel bit is in use, said second portion being integral with and constituting an extension of said first portion, said second portion having a cutting end distant from said first mentioned cutting end and said body having a slot extending over the entire length of said tubular body all the way between said cutting ends; and a core member slidably received in said tubular body and having a projection extending through said slot, said core member being readily removable from said tubular body by sliding of said projection toward and outwardly beyond one end of said slot.

2. A dowel bit as defined in claim 1, wherein said tubular body is of polygonal cross-section.

3. A dowel bit as defined in claim 1, wherein said tubular body is of circular cross-section.

4. A dowel bit as defined in claim 1, wherein said tubular body consists of a rolled-up section of sheet material.

5. A dowel bit as defined in claim 1, wherein the length of said core member is less than the length of said tubular body.

6. A dowel bit for drilling bores in plaster, brick, concrete and like materials, said bit comprising a tubular body having a wall of constant thickness and consisting of a first portion having a cutting end, and a second portion which is gripped while the dowel bit is in use, said second portion being integral with and constituting an extension of said first portion, said second portion having a cutting end distant from said first mentioned cutting end and said body having a slot extending over the entire length of said tubular body all the way between said cutting ends; and a core member of synthetic plastic material slidably received in said tubular body, for movement of any selected position intermediate the extremities of said tubular body so as to resist pressure exerted on said point by the chuck of a drilling machine in which said body is gripped and to prevent collapse of the latter, and said core member having an integral projection extending through said slot, said core member being readily removable from said tubular body by sliding of said projection toward and outwardly beyond one end of said slot.

References Cited by the Examiner

UNITED STATES PATENTS

| | | | |
|---|---|---|---|
| 658,060 | 9/1900 | Dudley | 175—401 |
| 1,716,984 | 6/1929 | Shiras | 175—403 X |
| 1,829,659 | 10/1931 | Keflo | 175—403 X |
| 1,847,136 | 3/1932 | Rauberstrauch | 175—87 |
| 3,103,982 | 9/1963 | Henderson | 175—403 |
| 3,173,314 | 3/1965 | Blackmer | 76—108 |
| 3,194,091 | 7/1965 | Woodward | 76—108 |
| 3,208,542 | 9/1965 | Fischer | 175—403 |

CHARLES E. O'CONNELL, *Primary Examiner.*

R. E. FAVREAU, *Assistant Examiner.*